(12) United States Patent
Sågfors et al.

(10) Patent No.: US 8,688,119 B2
(45) Date of Patent: Apr. 1, 2014

(54) METHOD, APPARATUS AND SYSTEM FOR MOBILITY ENHANCEMENT IN DRX

(75) Inventors: Mats Sågfors, Kyrkslätt (FI); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 12/771,799

(22) Filed: Apr. 30, 2010

(65) Prior Publication Data

US 2011/0269462 A1 Nov. 3, 2011

(51) Int. Cl.
*H04W 36/00* (2009.01)

(52) U.S. Cl.
USPC ........... 455/436; 455/437; 455/438; 455/439; 455/440; 455/441; 455/442; 455/443; 455/444; 370/331

(58) Field of Classification Search
USPC .................................. 455/436–444; 370/331
See application file for complete search history.

(56) References Cited

U.S. PATENT DOCUMENTS

| | | | |
|---|---|---|---|
| 7,760,676 B2 * | 7/2010 | Demirhan et al. ............ | 370/311 |
| 2005/0148348 A1 | 7/2005 | Cramby et al. | |
| 2008/0318643 A1 * | 12/2008 | Manna et al. ................. | 455/574 |
| 2009/0258664 A1 | 10/2009 | Huan | |
| 2010/0048209 A1 * | 2/2010 | Aoyama et al. ............ | 455/435.2 |

FOREIGN PATENT DOCUMENTS

| | | |
|---|---|---|
| WO | 2008/133564 A1 | 11/2008 |
| WO | 2008/143563 A1 | 11/2008 |
| WO | 2009/030289 A1 | 3/2009 |
| WO | 2009/075624 A1 | 6/2009 |

OTHER PUBLICATIONS

International Search Report mailed in corresponding International Application No. PCT/SE2011/050351 dated Sep. 16, 2011 (4 pages).
Written Opinion mailed in corresponding International Application No. PCT/SE2011/050351 dated Sep. 16, 2011 (10 pages).
3GPP TSG RAN WG2 #56, R2-063149, "Dormant mode and mobility procedure", Nov. 6-10, 2006, Riga, Latvia (3 pages).
3GPP TSG RAN2 Meeting on LTE, R2-061839, "Handover considerations", Jun. 27-30, 2006, Cannes, France (6 pages).
3GPP TSG RAN WG2 #56bis, R2-070088, "Summary of email discussion on DRX in LTE_Active", Jan. 15-19, 2007, Sorrento, Italy (9 pages).
3GPP TSG-RAN WG2 Metting #55, R2-062752, "Active Mode DRX", Oct. 9-13, 2006, Seoul, Korea (3 pages).

(Continued)

*Primary Examiner* — Amancio Gonzalez
(74) *Attorney, Agent, or Firm* — Nixon & Vanderhye, P.C.

(57) ABSTRACT

When a user equipment (UE) is in a CONNECTED state with a base station of a wireless network and is also in a discontinuous reception (DRX) mode, a DRX parameter such as DRX period for the UE is compared with a threshold. If the DRX parameter is at or below the threshold, the UE applies a network controlled mobility mode with UE assist where the network controls handover of the UE to another cell. If the DRX parameter is above the threshold, the UE applies a UE controlled mobility mode in which the UE is free to select a best cell. In this way, DRX benefit of reduced power consumption is maintained while the time period in which the UE is unreachable is minimized.

24 Claims, 5 Drawing Sheets

(56) References Cited

OTHER PUBLICATIONS

3GPP TS 36.321 V9.1.0, $3^{rd}$ Generation Partnership Project, Technical Specification Group Radio Access Network, Evolved Universal Terrestrial Radio Access (E-UTRA) Medium Access Control (MAC) protocol specification (Release 9), Dec. 2009 (pp. 1-48).

3GPP TS 36.331 V9.1.0, $3^{rd}$ Generation Partnership Project, Technical Specification Group Radio Access Network, Evolved Universal Terrestrial Radio Access (E-UTRA) Radio Resource Control (RRC), Protocol specification (Release 9), Dec. 2009 (pp. 1-233).

3GPP TS 36.133 V9.2.0, $3^{rd}$ Generation Partnership Project, Technical Specification Group Radio Access Network, Evolved Universal Terrestrial Radio Access (E-UTRA), Requirements for support of radio resource management (Release 9), Dec. 2009 (371 pages).

* cited by examiner

METHOD, APPARATUS AND SYSTEM FOR MOBILITY ENHANCEMENT IN DRX

TECHNICAL FIELD

Technical field of present disclosure relates to method, apparatuses and systems to enhance mobility of one or more user equipments operating in a DRX mode. In particular, the present disclosure relates to methods, apparatuses and systems to reduce power consumption, perform measurement, and provide measurement reporting activities of one or more user equipments that are in a long DRX mode while in a CONNECTED state.

BACKGROUND

In wireless network systems such as Wideband Code Division Multiple Access (WCDMA) and Long Term Evolution (LTE), discontinuous reception (DRX) mode can be used to reduce power consumptions in user equipments (UE). FIG. 1 illustrates a DRX cycle or DRX period which includes on-duration and DRX opportunity periods. During the on-duration period, the UE turns on its receivers to listen for scheduling information on downlink control channels from the network. In LTE for example, scheduling information is transmitted by the eNodeBs on the Physical Downlink Control Channel (PDCCH). During the DRX opportunity period, the UE may turn off its receivers, i.e., go to sleep, to reduce battery consumption. The DRX mode is important to increase the standby times of mobile devices such as small handsets.

Also in wireless systems, the mobility of a UE in terms of handover from one cell to another or a cell reselection can be either network controlled or UE controlled. In the network controlled mobility mode, the nodes on the network's infrastructure side such as the radio base station (RBS, eNodeB) and the radio network controller (RNC) are in charge of moving the UE from one cell to another. The network controlled mobility mode is typically UE assisted in which the UE measures the signal strengths of neighboring cells, and provides measurement reports to the network. Based on these reports, the network decides whether and when a handover should be executed. Handovers are typically issued by messages from the network to the UE, where the UE is commanded to perform the handover to a specific cell.

In the UE controlled mobility mode, the UE is allowed to autonomously perform cell reselection, i.e. the UE is free to select a new cell based on measurements of signals from multiple cells and application of some selection criteria and thresholds. The criteria and thresholds can be provided by the network. Typically, the UE reports to the new cell or to the cell area when the cell reselection is completed.

Wireless systems can deploy both mobility solutions. In LTE for example, radio resource control (RRC) protocol is modeled with two states—RRC_IDLE and RRC_CONNECTED. One difference between these two states is the applied mobility solution. In the RRC_IDLE state, the UE controlled mobility is implemented in which the UE performs the measurements and the cell reselection.

In the RRC_CONNECTED state, the network controlled mobility is implemented in which the network is in control of when the handover and cell reselection for the UE occurs. In this state, the UE's location is known to the network to at least on a cell granularity level, and explicit RRC signalling is involved when the UE moves from one cell to another cell.

In the RRC_IDLE state on the other hand, the UE's location may not be known exactly. When the network needs to reach the UE, paging that spans a larger tracking area consisting of multiple cells may be required. Thus, the UE only needs to report its cell change when it leaves its current tracking area which can span multiple cells. This reduces both signaling and UE battery consumption since the UE can move between multiple cells without being engaged in any signaling.

LTE supports the DRX mode in both the RRC_IDLE and RRC_CONNECTED states. In the RRC_IDLE state, the sleep periods that the UE can apply are primarily constrained by the paging period, i.e., the periodicity at which the UE needs to read the downlink channels from the network to find out whether there are any paging messages directed to the UE. Typical paging periods range from hundreds of milliseconds to several seconds. Between these paging opportunities, the UE can be asleep.

In the RRC_CONNECTED state, depending on the UE's level of activity, the UE can successively go down into deeper sleep modes. The activity of the UE refers to circumstances in which the UE is scheduled to receive messages from or transmit messages to the network. The UE is "active" if it finds itself scheduled for uplink and/or downlink communication. The UE is not considered to be active if it is only periodically waking up to read paging or system information.

Referring back to FIG. 1, the duration between the on-duration periods offers an opportunity for the UE to turn off its receivers. In LTE, two configurable DRX cycles are supported—a short DRX cycle and a long DRX cycle, c.f. TS 36.321. The UE that is inactive may stepwise increase the lengths of its DRX opportunity periods and correspondingly increase its sleep periods to improve battery preservation. A range of configurable DRX cycles in the RRC_CONNECTED state can be comparable to the paging cycles. Thus, it is possible to configure very efficient DRX also in the RRC_CONNECTED state such that a UE in the RRC_CONNECTED state can have similar standby times as a UE in the RRC_IDLE state.

In the RRC_CONNECTED state as noted above, the network controlled mobility is implemented in which the UE measurements are used to assist in the handover decision. However, a UE in a long DRX cycle cannot offer equally precise neighbor cell measurements. To conduct the cell measurements, the UE's receivers must be turned on. To provide high measurement accuracies, the UE must turn on its receivers more frequently, and frequent measurements hinder the UE from utilizing the DRX opportunities to save power.

Wireless systems typically also include functionalities to monitor the quality of the present radio link between the UE and the network, and a radio link failure (RLF) is detected when certain criteria are fulfilled. When the RLF occurs, appropriate actions are taken to recover or reestablish connection between the UE and the network.

Similar to the aforementioned mobility measurements, the radio link quality measurements also require the receivers be turned on. Thus, the RLF detection is dependent on the sleep-periods applied to the receivers. To facilitate long DRX opportunities, 3GPP requirements specify less stringent radio link quality monitoring when the UE is in a sleep mode, c.f. TS 36.133, clause 7.6.

In the RRC_CONNECTED state, the network controlled mobility applies until the UE declares an RLF, after which, the UE is allowed to select a better cell to recover the connection. Unfortunately, the declaration of the RLF and recovery therefrom can take a considerable amount of time, during which the UE may lack means to transmit or receive any data.

It is seen that a combination of long DRX cycles and UE assisted, network controlled mobility pose a tough challenge. For example, an inactive UE with a long DRX moving towards a cell border may not provide sufficiently accurate measurements to the network or may even fail to provide reports at all due to delay, thereby resulting in a failed handover or a radio link failure. Providing accurate measurements on the other hand would waste the power-saving opportunities offered by the DRX periods.

Since both the mobility measurement accuracies and the RLF criteria are functions of the DRX periods, the UE may remain without means to transmit or receive data during a non-negligible amount of time. The network will be unaware of this status of the UE, as the UE may not have been able to report any measurements to the network before the problem arises. In the RRC_CONNECTED state, the UE is allowed to communicate with the serving cell only, i.e, the cell the UE is currently connected with. However, without knowledge of the UE status, the network is not able to move the UE to a better cell.

Another problem is that when the UE is at a cell border, measurement reports may be triggered repeatedly. Whenever a measurement report is triggered, the UE leaves the DRX to transmit the report. If this situation prevails, the UE will not be able to remain in a battery saving mode, and the UE stand-by time in the RRC_CONNECTED state will be reduced significantly.

SUMMARY

The present invention addresses many issues of the conventional DRX implementation including the problems described above. One or more aspects of the present invention are directed toward methods, apparatuses and/or systems to reduce the time-period in which a UE remains unreachable from the network, and during which the UE has no means to transmit data in the uplink while still realizing power consumption benefits. One or more aspects of the present invention are also directed toward methods, apparatuses and/or systems to reduce battery consumption while still providing adequate measurement and measurement reporting activity of a UE that is in a long DRX mode while in a CONNECTED state.

A first aspect of the present invention is directed to a method of operating a UE in a DRX mode and in a CONNECTED state with a base station of a wireless network. In the method, the UE can determine whether a DRX parameter of the UE is at or below a DRX threshold. If the DRX parameter is at or below the DRX threshold, the UE can apply a network controlled mobility mode. Otherwise, the UE can apply a UE controlled mobility mode. When the network controlled mobility mode is applied, the network controls a handover of the UE from one cell to another. When the UE controlled mobility mode is applied, the UE is allowed to autonomously perform a cell reselection.

A second aspect is directed to a method of operating a network node of a wireless network. In the method, the network node can receive an update message, which is a cell update message or a connection reestablishment request message, from a UE performing the cell reselection. Based on the update message, the network node can identify a previous serving cell of the UE, and can retrieve a UE context of the UE from the previous serving cell. The update message from the UE can indicate that the UE sent the update message due to the UE performing a cell reselection while the UE was in the CONNECTED state with the previous serving cell and in a UE controlled mobility mode.

A third aspect is directed to a method of operating a UE in a DRX mode and in a CONNECTED state with a base station of a wireless network. In the method, the UE can determine whether a DRX parameter of the UE is at or below a DRX threshold. If the DRX parameter is at or below the DRX threshold, the UE can implement a first measurement configuration of providing measurement reports of neighboring cells to the base station. Otherwise, the UE can implement a second measurement configuration, of providing less frequent measurement reports of the neighboring cells to the base station relative to the first measurement configuration when the DRX parameter is above the DRX threshold. Providing less frequent measurement reports also includes providing no measurement reports.

A fourth aspect is directed to a UE for communicating with a wireless network. The UE can comprise a processing unit, a communication unit, a storage unit, and a measurement unit. The processing unit can be arranged perform processing to operate the UE to provide communication services to a user. The communication unit can be arranged to communicate with the wireless network and can include one or more wireless receivers which can be turned on and off. The storage unit can be arranged to store information necessary for operation of the UE and can be arranged to store code for the processing unit to execute. The measurement unit can be arranged to measure parameters related to radio signals. The processing unit can control the communication unit, the storage unit, and the measurement unit to provide the communication services to the user. When the UE is in a CONNECTED state with a base station of the wireless network and is operating in a DRX mode, the processing unit can determine whether a DRX parameter of the UE is at or below a DRX threshold. When the DRX parameter is at or below the DRX threshold, the processing unit can apply a network controlled mobility mode in which the network controls a handover of the UE from one cell to another. When the DRX parameter is above the DRX threshold, the processing unit can apply a UE controlled mobility mode in which the UE is allowed to autonomously perform a cell reselection.

A fifth aspect is directed to a network node of a wireless network. The network node can comprise a processing unit, a communication unit, and a storage unit. The processing unit can be arranged provide mobility enhancement services to a UE. The communication unit can be arranged to communicate with the UE. The storage unit can be arranged to store information necessary for operation of the network node and can be arranged to store code for the processing unit to execute. The processing unit can control the communication unit and the storage unit. When the communication unit receives an update message from the UE performing a cell reselection, the processing unit can identify a previous serving cell of the UE based on the update message, and can retrieve a UE context of the UE from the previous serving cell. The update message, which is either a cell update message or a connection reestablishment request message, from the UE can indicate that the UE sent the update message due to the UE performing the cell reselection while the UE was in the CONNECTED state with the previous serving cell and in the UE controlled mobility mode.

A sixth aspect is directed to a UE for communicating with a wireless network. The UE can comprise a processing unit, a communication unit, a storage unit, and a measurement unit. The processing unit can be arranged perform processing to operate the UE to provide communication services to a user. The communication unit, which can include one or more wireless receivers, which can be turned on and off, can be arranged to communicate with the wireless network. The storage unit can be arranged to store information necessary for operation of the UE and can be arranged to store code for the processing unit to execute. The measurement unit can be arranged to measure parameters related to radio signals. The processing unit can control the communication unit, the storage unit, and the measurement unit to provide the communication services to the user. When the UE is in a CONNECTED state with a base station of the wireless network, the processing unit can determine whether a DRX parameter of the UE is at or below a DRX threshold. When the DRX parameter of the UE is at or below the DRX threshold, the processing unit can implement a first measurement configuration of providing measurement reports of neighboring cells to the base station. When the DRX parameter is above the DRX threshold, the processing unit can implement a second measurement configuration, of providing less frequent measurement reports of the neighboring cells to the base station relative to the first measurement configuration or of providing no measurement reports.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
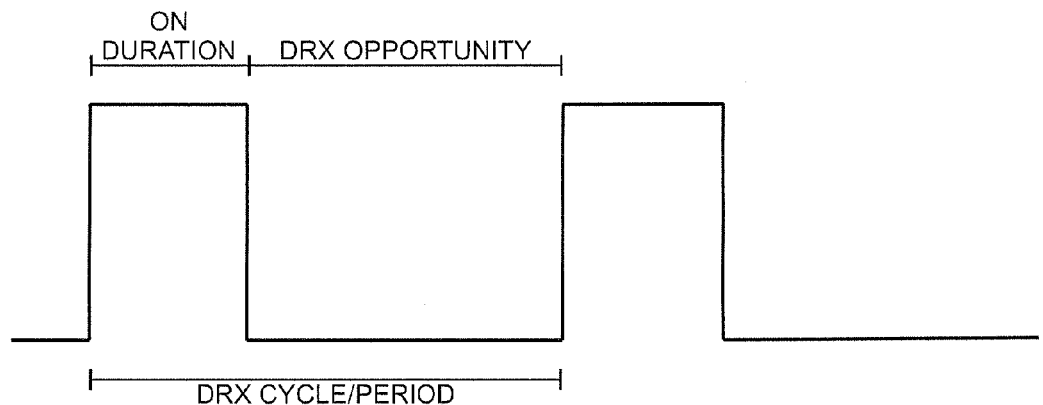
FIG. 1 illustrates a DRX cycle or period for a UE in a wireless network.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudocode, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In this document, terms "cell" or "base station" may be used interchangeably depending on the context. However, one should keep in mind that a "cell" is technically not equivalent to a "base station". Cell refers to a radio coverage area and base station refers to a radio communication equipment that provides radio coverage to the corresponding coverage area.

Example radio communication equipments include RBSes, Node Bs and eNodeBs in 3GPP, access points in WiFi or WLAN, and base stations in WiMAX. A single equipment can support or serve multiple cells, typically by operating multiple antennas independently such as one antenna per cell or a set of coordinated antennas for each cell. The cells may even overlap. Nevertheless, it is assumed that each cell is individually identifiable, e.g., each cell can have a global cell identity.

Also in this document, 3GPP is primarily used as examples for explanation purposes. However, the scope of this disclosure is not limited to the set of 3GPP wireless network systems. The scope thereof can encompass many domains of wireless network systems.

To emphasize that aspects of the invention can be generically applied, terms "CONNECTED" and "IDLE" will be used to denote some of the possible UE states. When a UE is in the CONNECTED state with the network, there is an established wireless communication link between the UE and the serving cell. Further, the UE is allowed to communicate only with the serving cell, i.e., only with the base station corresponding to the serving cell in the CONNECTED state. Thus, there is a context associated with the UE and the base station that is in control of the serving cell. Such context may include the identity of the UE, parameters characterizing the radio link configuration, security parameters, etc. Thus, the UE and the base station are both configured to be engaged in the communication.

When in the IDLE state, the UE is typically not fully prepared to be engaged in communication with the base station. In many cases, there is no UE context in any particular base station, but the context must be established before any data-transmission can take place. Typically, and as described before, the UE location is often not known at a cell-level to the network, and the network must page the UE in a larger area when the network needs to reach the UE for communication purposes.

Figure 2:
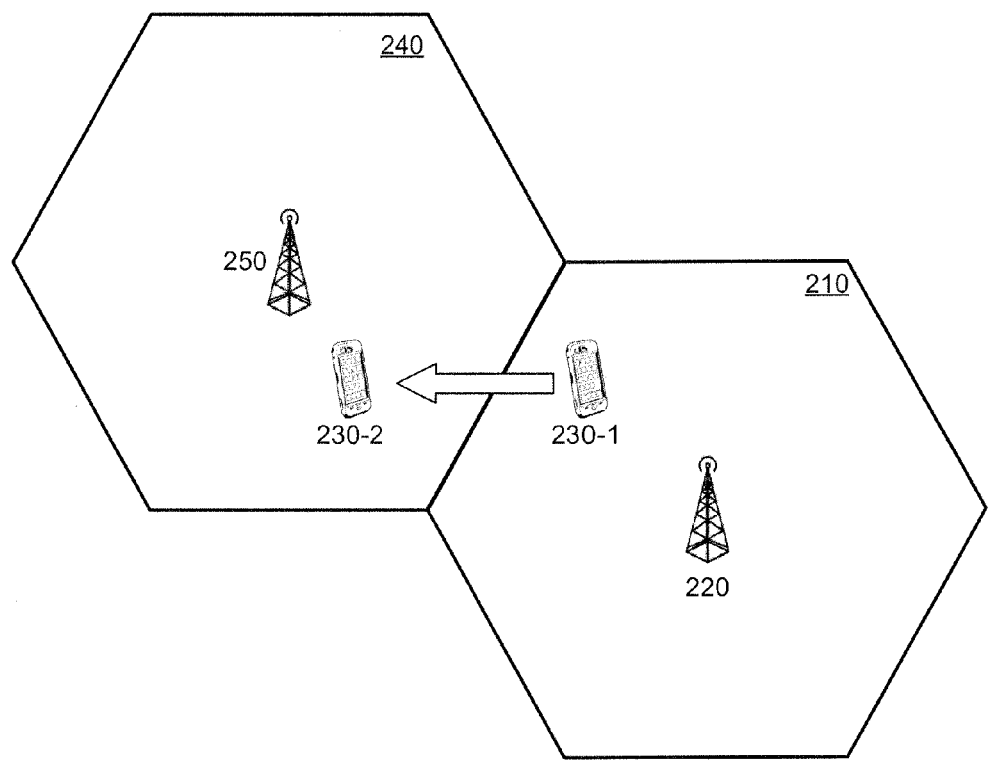
FIG. 2 illustrates an example movement of a UE from a serving cell to another cell.

It is noted above that the UE assisted, network controlled mobility combined with the long DRX cycle poses a tough challenge. That is, problems can arise when the UE is in the long DRX mode while also in the CONNECTED state. Long sleep periods are particularly problematic. This is illustrated in FIG. 2 which shows a movement of a UE 230 which is assumed to be in the CONNECTED state with a base station 220 corresponding to the cell 210. The UE 230-1 represents the location of the UE 230 when it goes to sleep, i.e. when it turns its receivers off, and the UE 230-2 represents the location of the same UE 230 at the end of the sleep period.

One specific problem arises in that when the UE 230 is in the long DRX mode while in the CONNECTED state, the UE 230 is allowed to communicate with the serving cell 210 only, i.e. communicate only with the serving base station 220. However, the network can be unaware of the UE's status during the long sleep period. Without this knowledge, the network is unable to handoff the UE 230 to a better cell. When the UE 230 awakens, it is no longer within the serving cell 210, and thus is unable to communicate with the serving base station 220.

Conventionally, this problem is addressed by allowing the UE 230 to select a better cell on its own when it detects a radio link failure. The UE 230, after attempting to monitor the radio link with serving base station 220, will declare an RLF, and will take actions to reestablish connection with the network, for example, with the base station 250 corresponding to cell 240. Thus, when the radio link failure occurs due to long DRX periods, the conventional method does provide a way to reestablish the connection between the network and the UE. But as noted, this conventional recovery process can take a significant amount of time during which the UE cannot transmit or receive any data.

One straight forward solution to address this problem would be to implement more stringent measurement requirements to the UE when the UE is in the long DRX mode. But as already mentioned, this would sacrifice the battery preservation properties, which is the primary purpose of the DRX functionality.

The inventors of the present subject matter have recognized that even when the UE is in the CONNECTED state, it is possible to gain battery saving benefits that DRX provides including the long DRX mode, and at the same time, minimize the time periods in which the UE remains unreachable. In other words, the inventive methods, apparatuses and systems reduce or eliminate the occurrences of the situation illustrated in FIG. 2.

Figure 3:
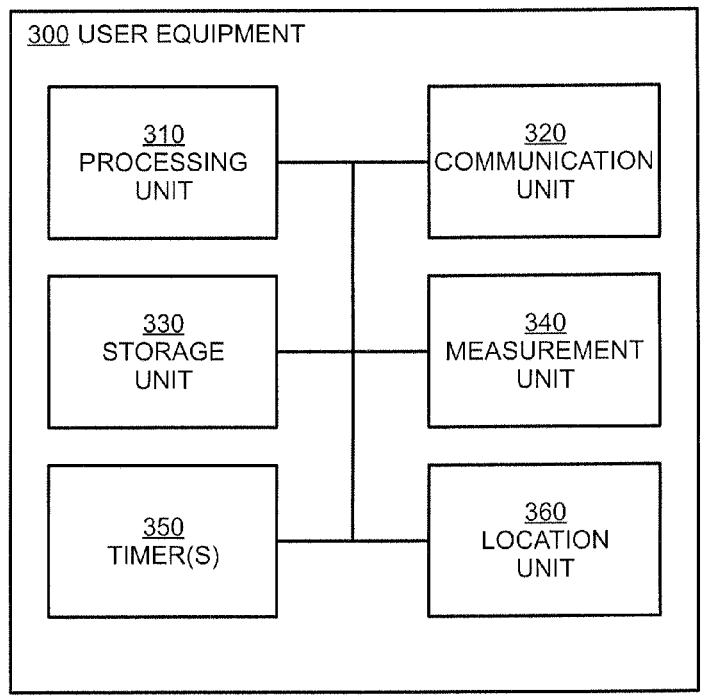
FIG. 3 illustrates a non-limiting embodiment of a UE.

FIG. 3 illustrates a non-limiting embodiment of a UE 300, which includes, among others, a processing unit 310, a communication unit 320, a storage unit 330, a measurement unit 340, one or more timers 350, and optionally a location unit 360 such as a GPS unit. The processing unit 310 is arranged to control other units 320, 330, 340, 350, 360 of the UE 300 to provide communications services to a user. The communication unit 320 may be arranged to communicate with cells of a wireless network, and may include one or more wireless receivers (not shown) which can be turned on and off to conserve power. The storage unit 330 may be arranged to store information necessary for the operation of the UE 300 and may also store code for the processing unit 310 to execute. The measurement unit 340 may be arranged to measure parameters related to radio signals such as the signal strength, bit error rate, and signal-to-noise ratio. The timers 350 may be arranged to govern the inactivity periods related to the DRX mode. The optional location unit 360 may be arranged to determine the location of the UE 300. While individual units are illustrated in separate blocks, one or more units may be realized as an integrated unit and/or realized through various combinations of hardware, software, and firmware components.

Figure 4:
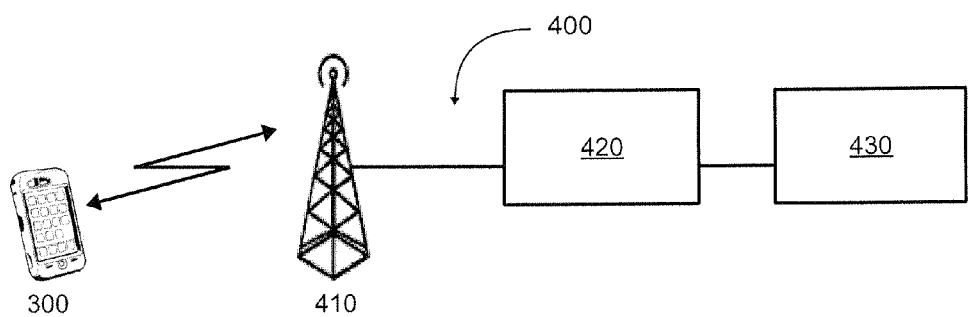
FIG. 4 illustrates a UE in a CONNECTED state with a wireless network.

In one or more non-limiting embodiments, the UE 300 can be connected to a wireless network 400 as illustrated in FIG. 4. The UE 300 can be in the CONNECTED state with the network 400 through base station 410, i.e., the UE 300 is prepared to send data to and receive data from the base-station 410 in the wireless network 400. In 3GPP for example, the UE has an RRC Connection with the network 400. In addition to the base station 410, the network 400 can also include a radio network controller (RNC) 420 and a core network (CN) 430. Wireless networks in reality are much more complex and include many nodes, but those are not illustrated for sake of clarity.

The UE 300 may be configured with a set of parameters that govern the UE's DRX behavior, such that the UE 300 can autonomously switch between different DRX modes. The set of parameters may be stored in the storage unit 330. The UE 300 may be manufactured with default parameters, which may be replaced or augmented manually or through automated updating procedures. Typically, the parameters are updated by signaling messages received from the network.

The processing unit 310 may perform the necessary processing, in conjunction with other units, to autonomously switch the DRX mode of the UE 300. Alternatively, the DRX mode may be explicitly signaled by the network 400 and the processing unit 310 may perform the necessary processing to respond to the network signaling. The UE 300 may be configured to go into deeper "sleep-modes" after longer times of UE inactivity. For example, UE 300 implements one or more timers 350 that govern the inactive part of the DRX period, such that the UE 300 is allowed to use longer DRX periods if a specific time has occurred since the last time the UE was active. In most instances, longer DRX periods usually indicate longer sleep periods, and thus better power conservation.

One should note the distinction between the activity/inactivity of the UE and the active/inactive part of the DRX period. Activity of the UE refers to the UE sending user data to and/or receiving user data from the network. As discussed above, the UE monitors the downlink (DL) control channel from the network to determine whether any DL and/or UL data channel resources have been scheduled for the UE. Whether the UE is sending/receiving the user data relates to whether the UE is active or inactive.

On the other hand, the active and inactive parts of the DRX period relate to the DRX cycle. Referring back to FIG. 2, during the on-duration period, the UE monitors the downlink control channel to determine whether any user data channel has been scheduled for the UE. Thus, the DRX active part includes the on-duration period. During the DRX-opportunity period, the UE may go to sleep, i.e., turn off its receivers. Thus, the DRX inactive part may include some or all of the DRX-opportunity period.

The UE must wake up, i.e., turn on its receivers, from time to time so that it can monitor the downlink control channel to receive the scheduling information. It should be noted that the UE is not considered to be active when it wakes to monitor the downlink control channel during the DRX active part.

Referring again to FIG. 4, examples of the timers 350 that can be implemented include, among others, an on-Duration Timer which governs how many consecutive subframes the UE should monitor the downlink control channel at the beginning of a DRX Cycle, a drx-Inactivity Timer which governs the number of consecutive subframes the UE should monitor the downlink control channel after successfully decoding a scheduling command for an initial UL or DL user data transmission, a drx-Retransmission Timer which governs the maximum number of consecutive subframes during which the UE may expect a DL re-transmission, and a drx Short Cycle Timer which governs the time or a number of subframes that the UE should follow the Short DRX cycle.

Figure 5:
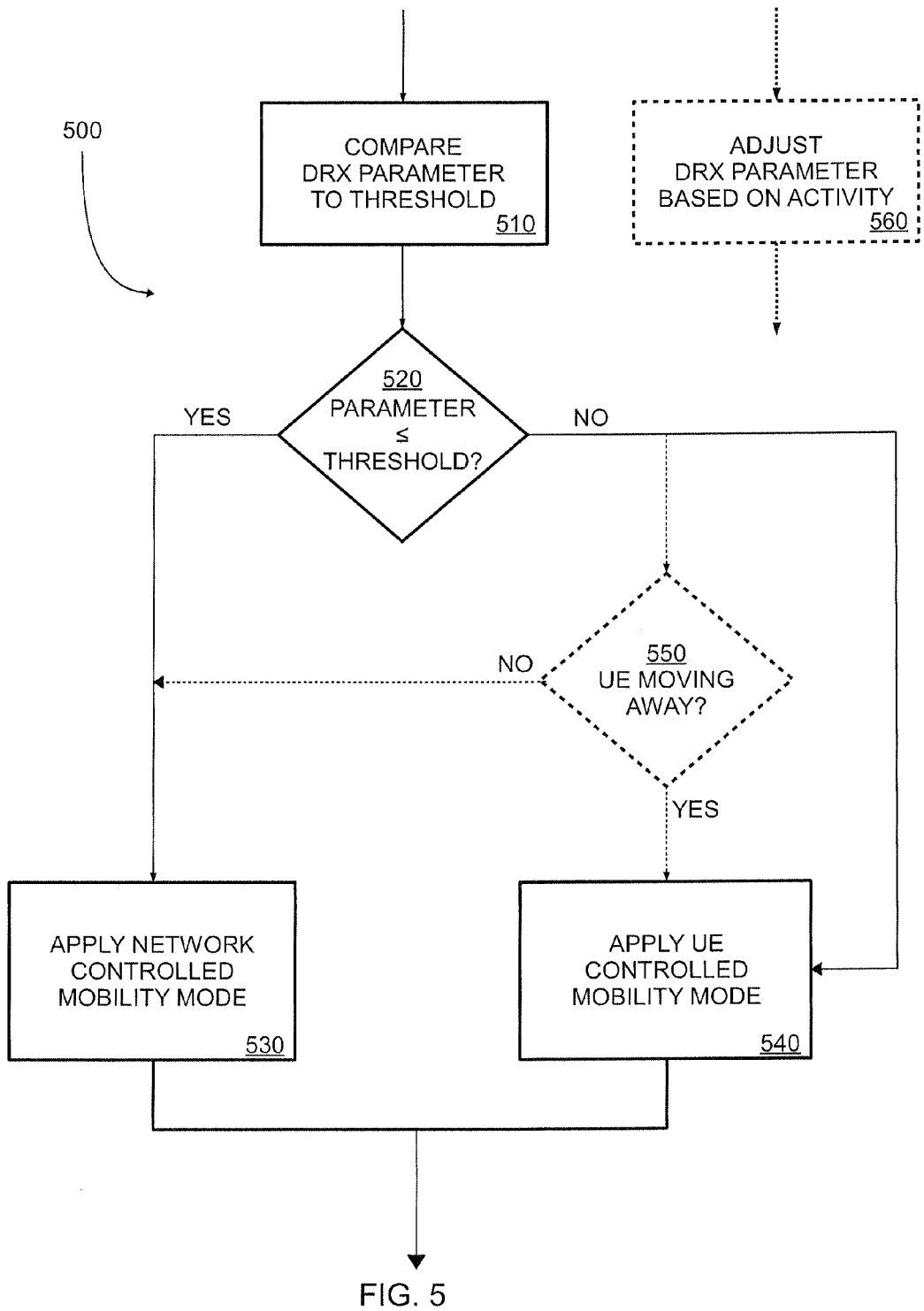
FIG. 5 illustrates a non-limiting example method performed by a UE in a CONNECTED state with the network for mobility enhancement while in a DRX mode.

FIG. 5 illustrates a non-limiting example method 500 that may be performed by the UE 300, which is in the CONNECTED state with the network 400 via the base station 410. In method 500, the processing unit 310 may compare a DRX parameter to a related DRX threshold in step 510 and in step 520, the processing unit 310 may determine whether the DRX parameter is at or below the DRX threshold. If the parameter is at or below the threshold, then the processing unit 310 may apply the network controlled mobility mode in step 530. If the DRX parameter is above the DRX threshold, then the processing unit 310 may apply the UE controlled mobility mode in step 540. Here, "applying" the network or the UE controlled mobility mode is intended to convey that the UE enters, i.e., switches to, the applied mode if it was not in the applied mode previously.

When the UE controlled mobility mode is applied in step 540, it is preferred that UE remain in the CONNECTED state. For example, the UE in a fixed location can remain in the CONNECTED state. At times of low activity, the UE can cease or significantly reduce performing power consuming measurements, even if the location happens to be at a cell border. By remaining in the CONNECTED state, the UE can start sending and receiving data as soon as some data arrives.

The DRX parameter compared in step 510 may be the DRX period of the UE. As noted above, long DRX cycles are usually associated with long sleep periods. Referring back to FIGS. 1 and 2, the DRX threshold is preferably set so that when the UE's DRX period is at or below the threshold, the UE is unlikely to have moved out of the serving cell 210 before it awakens. As long as the UE is within the serving cell, radio link failure is unlikely and the network controlled mobility decisions may be reliably made. Because radio link failure is unlikely, the amount of time in which the UE is unreachable is minimized. The UE would be unreachable essentially only for the duration of the inactive part of the DRX period, i.e, the DRX opportunity part as seen in FIG. 1.

However, if the UE's DRX period is above the threshold indicating a relatively long DRX opportunity, there is a greater likelihood that when it next awakens, the UE 300 may be out of the serving cell. By applying the UE controlled mobility mode, the UE's measurement unit 340 may take measurements of the radio signals in the surroundings and the processing unit 310 may select the best cell based on the measurement results. With reference to FIG. 2, if the current serving cell 210 happens to be the best cell, then no connection reestablishment processing is necessary. If the serving cell 210 is not detected or is not the best cell, the processing unit 310 may perform a cell reselection process to establish connection with the selected best cell such as the cell 240 via the communication unit 320.

By allowing the UE 300 to apply the UE controlled mobility mode, the process of monitoring connection with the serving cell 210, detecting and declaring RLF, and performing associated recovery procedures can be avoided even when the UE 300 wakes up outside of the serving cell 210. This again minimizes the amount of time in which the UE 300 is unreachable from the network. Further, the long DRX period can be maintained, which in turn maintains the battery saving benefits of DRX.

Other parameters may be used as the DRX parameter. For example, the duration of the DRX inactive part may be used. If the DRX inactive part is short, the network controlled mobility may be applied. If the DRX inactive part is long, the UE controlled mobility may be applied. The dividing line, i.e., the threshold, may be set to a predetermined value to determine whether the DRX inactive part is short or long. As another example, the duration since last UE active time, e.g., since last time UE sent or received user data or was scheduled to send or receive user data, may be used as the DRX parameter.

In another alternative, even if the DRX parameter such as the DRX cycle is determined to be above the threshold in step 520, if the UE 300 is not moving away from the base station of the serving cell, then the processing unit 310 may still apply the network controlled mobility mode. In this alternative, the UE controlled mobility mode is applied when the DRX parameter is above the threshold and the UE is moving away. This is illustrated in FIG. 5 with decision step 550 and connecting flow lines in dashes. Whether or not the UE is moving away from the serving base station, in the radio sense or the physical sense, may be inferred through differences in the signal power transmitted by the base station and the signal power received by the UE or vice versa. If the UE includes a location unit 360, whether or not it is moving away can be determined explicitly.

In yet another alternative, the parameter compared in step 520 may be the proximity of the UE to a boundary of the serving cell. Based on geographical distribution of the base stations as well as the configuration of the base station such as the maximum transmission power of the base station, cell boundaries can be determined with a fairly reliable degree of accuracy. If the UE 300 is located close to the serving cell's boundary, e.g., based on the location determined by the GPS unit 360 or relative equivalence in radio signal qualities from base stations received by the UE, the UE controlled mobility mode may be applied.

Instead of proximity to the cell boundary, distance away from the serving base station may be used as the comparison parameter, also called the DRX parameter. Further, the UE's movement, e.g. as determined in decision step 550, may be considered in conjunction with either of the comparison parameters proximity or distance as defined above.

Note that if the proximity to the cell boundary is used as the comparison parameter, the decision criteria in step 520 should be reversed. That is, the UE controlled mobility mode should be applied when the distance to the boundary is less than or equal to a threshold distance. Of course, an inverse of the proximity parameter may be used as the comparison parameter and the same criteria can be used, i.e., the criteria need not be reversed in this case.

Thus, it should be appreciated that depending on the particular criteria used, one side of the threshold will logically point to the UE controlled mobility being applied and the other side will point to the network controlled mobility being applied. The invention fully contemplates that depending on the criteria used, the comparison in step 520 can be reversed. Thus, step 520 should be taken in that inclusive sense and the particular comparison in the illustrated step 520 is provided merely as a matter of convenience.

In an embodiment, the processing unit 310 may adjust the DRX parameter depending on the UE's activity level. Again, it is emphasized that the activity level of the UE 300 depends on whether the UE 300 is being, or has been scheduled by the base station 410, either in the uplink or downlink. The UE monitoring the downlink control channel to determine whether or not it has been scheduled is not considered to be an activity for the purposes of determining the UE's activity level. Further, the UE is not considered as scheduled, if the UE autonomously reads the downlink control channel to find broadcasted information such as paging or system information. Thus, a reading of a paging channel or a broadcast channel by the UE would typically not affect the subsequent activity level of the UE.

In this embodiment, if the UE is not scheduled, and has not been scheduled for a threshold amount of time, the UE may reduce its monitoring of the downlink control channel to preserve battery resource. The DRX period may be lengthened by a predetermined amount of time in this instance. If resources are scheduled, e.g., base station 410 indicates that there are data for the UE 300, the DRX period may be shortened by same or different predetermined amount or may be set to a default duration since future resources scheduling is likely for the UE 300. Depending on the amount of resources scheduled, the UE 300 may be set to operate in non-DRX mode. In another example, activities of the user, e.g. the user entering a text message, may trigger increased activities of the UE 300, and hence changes in the DRX parameter may be desirable.

The DRX parameter adjustment is indicated as step 560 in FIG. 5. This step is shown as a dashed box to indicate that the step is optional. Also, the step is not connected to any of the steps 510-550 to indicate that the DRX parameter can be adjusted apart from steps to determine whether the UE should be in the network or UE controlled mobility mode.

Note that in step 560, the threshold value for the DRX parameter may be adjusted as well, for example, on a cell by cell basis. As an illustration, where there are many base stations in a given geographical area, e.g. a downtown business district, the coverage area of an individual base station—i.e., the cell area—may be relatively small. Conversely, where there are few base stations, e.g. in rural settings, each cell area may be relatively large. A moving UE will require less time to move into a neighboring cell when current cell size is relatively small, and conversely will require longer time when the cell size is large. The threshold values may differ from cell to cell.

Even within one cell, the threshold values may be set differently for different UEs. A fast moving UE, e.g. that of a user in a car, will take less time than a slow moving UE, e.g. that of a walking user, to reach the neighboring cell. Moving speed can be inferred through measuring signal power levels over time—higher change indicates higher speed—or may be determined explicitly, e.g. through the GPS unit 360.

Thus, in an embodiment, threshold values may be adjusted on a cell by cell basis as well as on UE by UE basis. The adjustments in the DRX parameters and/or thresholds may be performed by the UE on its own or the network can signal the UE to make the appropriate adjustments taking into account the specific circumstances and capabilities of the UE.

In steps 510 and 520, a single DRX parameter is compared to a threshold and the decision to apply the network or the UE controlled mobility is made. Similarly, in step 560, a single parameter and/or threshold value is adjusted. However, the invention is not so limited. It is fully contemplated that multiple parameters may be considered in steps 510 and 520, and multiple parameters may be adjusted in step 560. Regardless of whether one or a combination of parameters is used, proper decision criteria should be provided in step 520 such that if step 530 is taken, reliable network controlled mobility service may be provided. Otherwise, the UE controlled mobility mode should be applied, step 540. The decision criteria may be based on a single parameter value, a sum of multiple parameter values, a weighted sum of multiple parameter values, and so on.

In an embodiment, when the UE controlled mobility is applied, i.e., the processing unit 310 performs step 540, the processing unit 310 may reselect a cell among a set of identified cells. The processing unit 310 may identify the cells based on measurements of the radio signals of the serving cell and the neighboring cells made through the measurement unit 340. In a preferred alternative, a set of neighboring cells may be provided by the network via communication between the base station 410 and the communication unit 320 when the UE 300 first establishes connection with the corresponding cell. This allows the UE 300 to specifically search for those cells resulting in more efficient reselection.

When the cell reselection is performed, the processing unit 310 preferably updates the network through the communication unit 320 in a cell update message or in a connection reestablishment request message. For simplicity, "update message" will be used to refer to either the cell update or the connection reestablishment request message. The update message can include an indication that the update message is caused by the UE in the CONNECTED state and in UE controlled mobility mode performing the cell reselection. The update message can further include information regarding the connection the UE had with the network prior to the cell reselection. This "prior connection information" can include a Cell Radio Network Temporary Identifier (C-RNTI) of the UE. The prior connection information can also include a cell identity (cell ID) and/or the base station identity (base station ID) of the previous serving cell.

On the network side, when the update message is received from the UE via the base station, the network may perform a method to find the UE context associated with the UE that sends the message. Referring back to FIG. 2, the base station 250 of the cell 240 may receive the update message from the UE 230.

Figure 6:
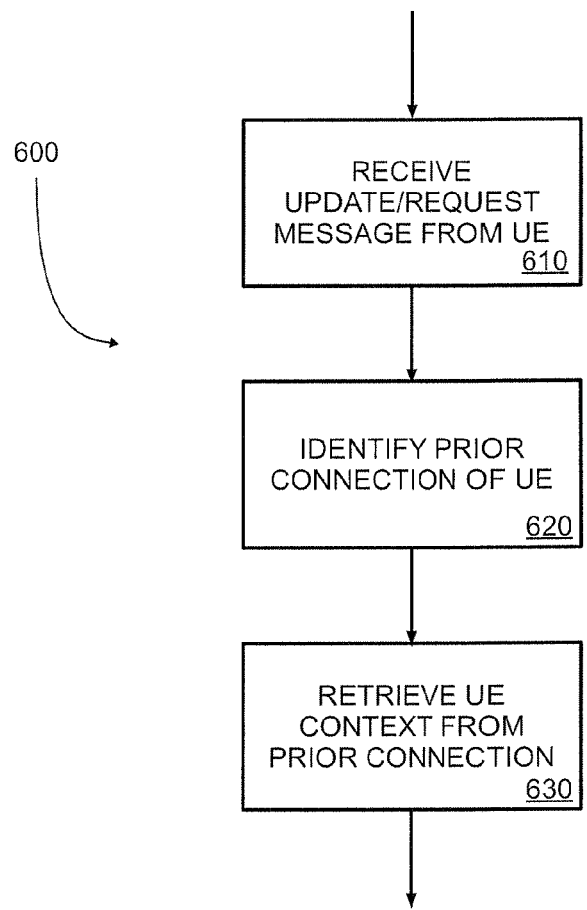
FIG. 6 illustrates a non-limiting example method performed by a network node to find a context of a UE making a request for cell reselection or updating the network.

FIG. 6 illustrates a non-limiting method 600 which may be performed by the base station 410 to find the context of the UE 230. In step 610, the base station 410 receives an update message from the UE 230. In step 620, the base station 410 identifies the previous serving cell based on the update message. For example, the update message can include the prior connection information discussed above. In step 630, the base station 410 then retrieves the UE context from the network node or base station that the UE was connected to in the previous serving cell, i.e. during the prior connection. In one embodiment, the UE context can contain the same information as used during a normal prepared handover. It should be noted that the network can either accept or reject that the UE stays in the CONNECTED state after the cell reselection. If the network accepts that the UE stays in the CONNECTED state the connection is reestablished with the network node, e.g. the base station 410. If the network rejects that the UE stays in the CONNECTED state after the cell reselection, the UE should go to the IDLE state and no connection is established or reestablished.

While the method 600 is described as being performed by the base station 410, it should be noted that other network nodes such as the RNC 420 or nodes within the CN 430 may be involved in the method. In another embodiment, the RNC 420 or other network nodes may perform the method and the base station 410 acts as a conduit for message exchange between the UE and the network nodes.

Figure 7:
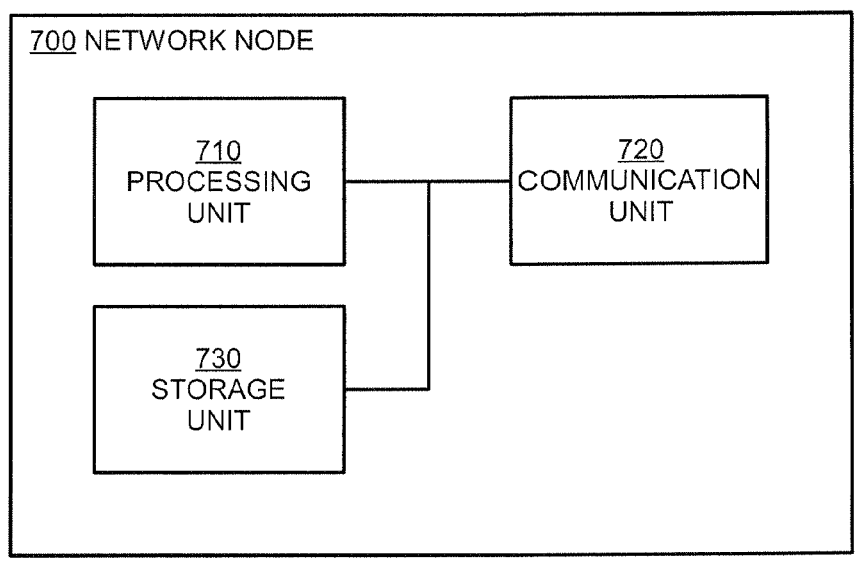
FIG. 7 illustrates a non-limiting embodiment of a network node.

FIG. 7 illustrates a non-limiting embodiment of a network node 700 that performs the method 600. The node 700 may include, among others, a processing unit 710, a communication unit 720, and a storage unit 730. The processing unit 710 may be arranged to control the communication and storage units 720, 730 to provide mobility enhancement services to the UEs. The communication unit 720 may be arranged to communicate with UEs directly, e.g. if the network node is the base station, or indirectly through the base station. The storage unit 730 may be arranged to store information necessary for operation of the node 700 and may also store code for the processing unit 710 to execute. While the units are illustrated in separate blocks, one or more units may be realized as an integrated unit and/or realized through various combinations of hardware, software, and firmware components.

Figure 8:
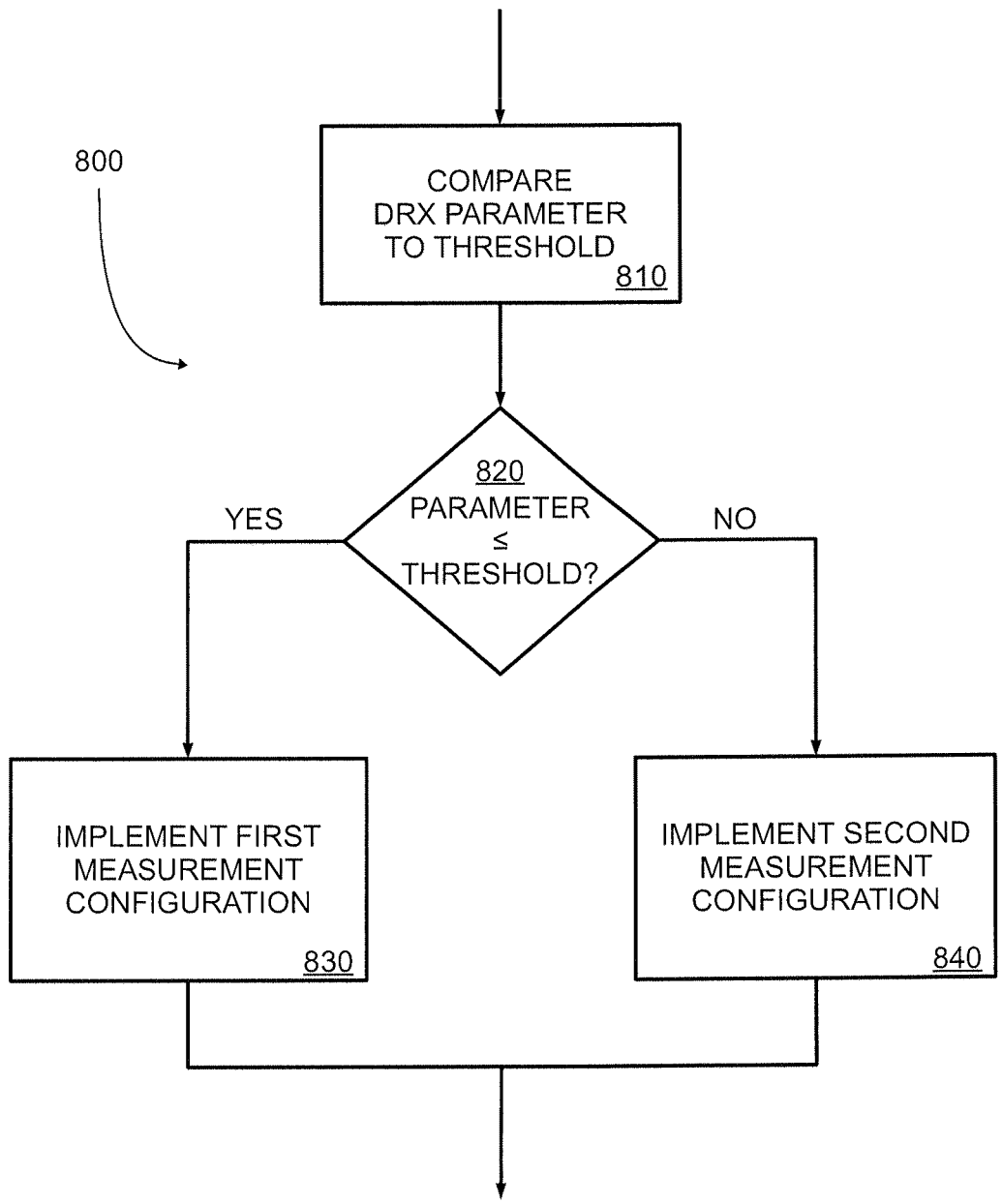
FIG. 8 illustrates a non-limiting example method for configuring measurement reports performed by a UE in a CONNECTED state with the network.

It was discussed above that a UE at a border of a cell is problematic in that repeated measurement reports may be triggered. Whenever a measurement report is triggered, the UE leaves the DRX mode. Thus, repeated report triggering can have significant undesirable effect in terms of power consumption. FIG. 8 illustrates a non-limiting method 800 performed by the UE, which is in CONNECTED state with the network, to address this situation.

In method 800, the processing unit 310 may compare a DRX parameter to a related DRX threshold in step 810 and may determine whether the DRX parameter is at or below the DRX threshold in step 820. If so, the processing unit 310 may implement a first measurement configuration in step 830. For example, the processing unit 310 may take the measurements of signals of neighboring cells provided by the measurement unit 340, and send measurement reports to the serving base station 410 through the communication unit 320 to assist the network in making handover or cell reselection decisions.

On the other hand, if in step 820 it is determined that the DRX parameter is above the DRX threshold, then in step 840, the processing unit 310 may implement a second measurement configuration. For example, the second measurement configuration may include less measurement taking and/or reporting, or completely omitting measurement taking and/or reporting.

With the method 800, the UE in a long DRX mode need not provide repeated measurement reports when it is near the cell intersection or border. The UE may select and stay with the best cell. This has the added benefit of reducing interference caused in a neighboring cell by the UE trying to send measurement reports outside of serving cell coverage.

Note that the DRX parameter compared in the method 800 can be the same or different from the DRX parameter compared in method 500. Even if the same DRX parameter is used in both methods, the threshold values need not be the same. In addition, while only two measurement configurations are illustrated, the number of measurement configuration that can be implemented is not so limited. In an embodiment, it is preferred that for each measurement configuration, a frequency of measurements taken and reported is commensurate with the DRX period of the UE. In another embodiment, the UE in the UE controlled mobility mode may omit reporting the measurements altogether. However, the UE in the UE controlled mobility mode may still make measurements to perform cell reselection.

There are numerous advantages to the disclosed technology. A non-exhaustive list of these advantages include:
- Long outages due to the combination of long DRX and network controlled mobility is prevented or significantly reduced;
- Long DRX in CONNECTED state can be applied to UEs with little to no risk of losing connectivity to the UEs; and
- Less measurement reports and better power preserving capabilities of UEs that are located near cell intersections and cell borders.

Although the description above contains many specifics, these should not be construed as limiting the scope of the invention, but construed as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method of operating a user equipment (UE) for communicating with a wireless network, the method comprising:
the UE determining whether a DRX parameter of the UE is at or below a DRX threshold, the UE being in a CONNECTED state with a base station of the wireless network and operating in a discontinuous reception (DRX) mode;
the UE applying a network controlled mobility mode when the DRX parameter is at or below the DRX threshold; and
the UE applying a UE controlled mobility mode when the DRX parameter is above the DRX threshold, wherein
when the network controlled mobility mode is applied, the network controls a handover of the UE from one cell to another, and
when the UE controlled mobility mode is applied, the UE is allowed to autonomously perform a cell reselection.

2. The method according to claim 1, wherein the DRX parameter is any combination of a DRX period, a DRX inactive part, and a time since scheduling of last activity of the UE.

3. The method according to claim 1, further comprising the UE adjusting the DRX parameter based on an activity level of the UE.

4. The method according to claim 3, wherein the UE lengthens a DRX period when scheduling information from the base station indicates that no resources are scheduled for the UE, and shortens the DRX period when the scheduling information indicates that there are resources scheduled for the UE.

5. The method according to claim 1, wherein when the UE controlled mobility mode is applied, the UE reselects a cell among a set of identified cells.

6. The method according to claim 5, wherein the set of identified cells is identified by the UE through measuring radio signals of a serving cell and of neighboring cells, or is a set of neighboring cells received from the base station, or both.

7. The method according to claim 5, wherein the UE updates the network in an update message after the cell reselection, the update message being either a cell update message or a connection reestablishment request message.

8. The method according to claim 7, wherein the update message comprises an indication that the update message is sent due to the UE performing the cell reselection while the UE is in the CONNECTED state and in the UE controlled mobility mode.

9. The method according to claim 7, wherein the update message comprises prior connection information of the UE comprising any one or more of a C-RNTI of the UE, a cell ID of a previous serving cell, and a base station ID of the previous serving cell.

10. A method of operating a user equipment (UE) for communicating with a wireless network, the method comprising:

the UE determining whether a DRX parameter of the UE is at or below a DRX threshold the UE being in a CONNECTED state with a base station of the wireless network and operating in a discontinuous reception (DRX) mode;

the UE implementing a first measurement configuration of providing measurement reports of neighboring cells to the base station when the DRX parameter is at or below the DRX threshold; and the UE implementing a second measurement configuration, of providing less frequent measurement reports of the neighboring cells to the base station relative to the first measurement configuration or no measurement reports when the DRX parameter is above the DRX threshold.

11. The method according to claim 10, wherein the DRX parameter is any combination of a DRX period, a DRX inactive part, and a time since scheduling of last activity of the UE.

12. A user equipment (UE) for communicating with a wireless network, the UE comprising:
a processing unit arranged to perform processing to operate the UE to provide communication services to a user;
a communication unit arranged to communicate with the wireless network, the communication unit comprising one or more wireless receivers which can be turned on and off;
a storage unit arranged to store information necessary for operation of the UE and arranged to store code for the processing unit to execute; and
a measurement unit arranged to measure parameters related to radio signals, wherein
the processing unit controls the communication unit, the storage unit, and the measurement unit to provide the communication services to the user, and
when the UE is in a CONNECTED state with a base station of the wireless network and is operating in a discontinuous reception (DRX) mode, the processing unit is arranged to:
determine whether a DRX parameter of the UE is at or below a DRX threshold,
when the DRX parameter is at or below the DRX threshold, apply a network controlled mobility mode in which the network controls a handover of the UE from one cell to another, and
when the DRX parameter is above the DRX threshold, apply a UE controlled mobility mode in which the UE is allowed to autonomously perform a cell reselection.

13. The UE according to claim 12, wherein the DRX parameter is any combination of a DRX period, a DRX inactive part, and a time since scheduling of last activity of the UE.

14. The UE according to claim 12, wherein the processing unit is arranged to adjust the DRX parameter based on an activity level of the UE.

15. The UE according to claim 14, wherein the processing unit lengthens a DRX period when scheduling information from the base station indicates that no resources are scheduled for the UE, and shortens the DRX period when the scheduling information indicates that there are resources scheduled for the UE.

16. The UE according to claim 12, wherein when the UE controlled mobility mode is applied, the processing unit reselects a cell among a set of identified cells.

17. The UE according to claim 16, wherein the set of identified cells are identified by the processing unit based on measurements of radio signals of a serving cell and of neighboring cells performed by the measurement unit, or are a set of neighboring cells received by the communication unit from the base station, or both.

18. The UE according to claim 16, wherein the processing unit updates the network in an update message via the communication unit, the update message being either a cell update message or a connection reestablishment request message.

19. The UE according to claim 18, wherein the update message comprises an indication that the update message is sent due to the UE performing the cell reselection while the UE is in the CONNECTED state and in the UE controlled mobility mode.

20. The UE according to claim 18, wherein the update message comprises prior connection information of the UE comprising any one or more of a C-RNTI of the UE, a cell ID of a previous serving cell, and a base station ID of the previous serving cell.

21. A user equipment (UE) for communicating with a wireless network, the UE comprising:
a processing unit arranged perform processing to operate the UE to provide communication services to a user;
a communication unit arranged to communicate with the wireless network, the communication unit comprising one or more wireless receivers which can be turned on and off;
a storage unit arranged to store information necessary for operation of the UE and arranged to store code for the processing unit to execute; and
a measurement unit arranged to measure parameters related to radio signals, wherein
the processing unit controls the communication unit, the storage unit, and the measurement unit to provide the communication services to the user, and
when the UE is in a CONNECTED state with a base station of the wireless network and is operating in a discontinuous reception (DRX) mode, the processing unit is arranged to:
determine whether a DRX parameter of the UE is at or below a DRX threshold,
implement a first measurement configuration of providing measurement reports of neighboring cells to the base station when the DRX parameter is at or below the DRX threshold, and
implement a second measurement configuration, of providing less frequent measurement reports of the neighboring cells to the base station relative to the first measurement configuration or no measurement reports when the DRX parameter is above the DRX threshold.

22. A method of operating a user equipment (UE) for communicating with a wireless network, the method comprising:
the UE determining whether a DRX parameter of the UE is at or below a DRX threshold when the UE is in a CONNECTED state with a base station of the wireless network and is operating in a discontinuous reception (DRX) mode;
the UE applying a network controlled mobility mode when the DRX parameter is at or below the DRX threshold;
the UE determining whether the UE is moving away from the base station;
the UE applying the network controlled mobility mode the UE is not moving away from the base station; and
the UE applying a UE controlled mobility mode when the DRX parameter is above the DRX threshold and the UE is moving away from the base station, wherein when the network controlled mobility mode is applied, the network controls a handover of the UE from one cell to another, and wherein when the UE controlled mobility mode is applied, the UE is allowed to autonomously perform a cell reselection.

23. A user equipment (UE) for communicating with a wireless network, the UE comprising:

a communication unit arranged to communicate with the wireless network;

a storage unit arranged to store information necessary for operation of the UE; and a processing unit arranged control the communication unit and the storage unit to provide the communication services to a user, wherein when the UE is in a CONNECTED state with a base station of the wireless network and is operating in a discontinuous reception (DRX) mode, the processing unit is arranged to:

determine whether a DRX parameter of the UE is at or below a DRX threshold, apply a network controlled mobility mode when the DRX parameter is at or below the DRX threshold, determine whether the UE is moving away from the base station, apply the network controlled mobility mode the UE is not moving away from the base station, and apply a UE controlled mobility mode when the DRX parameter is above the DRX threshold and the UE is moving away from the base station, wherein when the network controlled mobility mode is applied, the network controls a handover of the UE from one cell to another, and wherein when the UE controlled mobility mode is applied, the UE is allowed to autonomously perform a cell reselection.

24. The UE according to claim 21, wherein the DRX parameter is any combination of a DRX period, a DRX inactive part, and a time since scheduling of last activity of the UE.

* * * * *